United States Patent [19]

Takagi et al.

[11] Patent Number: 5,335,273
[45] Date of Patent: Aug. 2, 1994

[54] PORTABLE TELEPHONE AND MULTIFUNCTIONAL PROTECTIVE HOUSING THEREFOR

[75] Inventors: Hisamitsu Takagi, Inagi; Akihide Nishiyama, Yokohama; Masashi Tomura, Tokyo, all of Japan

[73] Assignee: Fujitsu Limited, Kawasaki, Japan

[21] Appl. No.: 756,587

[22] Filed: Sep. 9, 1991

[30] Foreign Application Priority Data

Sep. 7, 1990 [JP] Japan ................................. 2-235660

[51] Int. Cl.⁵ .............................................. H04M 1/00
[52] U.S. Cl. ..................................... 379/433; 379/434
[58] Field of Search ................. 379/433, 434, 58, 144; 395/149, 153, 173; 248/688

[56] References Cited

U.S. PATENT DOCUMENTS

| | | | |
|---|---|---|---|
| 4,153,822 | 5/1979 | Ueda et al. | 379/370 |
| 4,897,873 | 1/1990 | Beutler et al. | 379/433 |
| 5,024,414 | 6/1991 | Drain | 248/688 |

FOREIGN PATENT DOCUMENTS

| | | | |
|---|---|---|---|
| 276403 | 8/1988 | European Pat. Off. | 379/144 |
| 2538978 | 9/1984 | France | 379/144 |
| 56-6544 | 1/1981 | Japan | 379/370 |
| 61-7145 | 1/1986 | Japan | 379/433 |
| 62-185440 | 8/1987 | Japan . | |
| 3-85949 | 4/1991 | Japan | 379/433 |

*Primary Examiner*—James L. Dwyer
*Assistant Examiner*—Jack Chiang
*Attorney, Agent, or Firm*—Staas & Halsey

[57] ABSTRACT

A portable telephone having a cover to which a functional module such as an electronic calculator or a clock module is detachably mounted. The cover is rotatably mounted to a body of the portable telephone. Plural kinds of functional modules are replaceably mounted to the cover, thereby making the portable telephone multifunctional. Also disclosed herein is a construction that a multifunctional module mounting member is rotatably mounted to the body of the portable telephone, and a desired functional module is mounted to this mounting member by plug-in connection employing connectors.

2 Claims, 14 Drawing Sheets

PORTABLE TELEPHONE AND MULTIFUNCTIONAL PROTECTIVE HOUSING THEREFOR

FIELD OF THE INVENTION

The present invention relates to a portable telephone. In the following description, it is to be noted that the term of portable telephone used herein also includes a general cordless telephone.

BACKGROUND OF THE INVENTION

An ultimate object of communication is, of course, to enable intention or information to be transmitted or exchanged at once anytime, from anywhere, and by anybody. In addition to a conventional intercommunication between fixed points, a mobile communication has been gradually developed. The mobile communication means a communication between a mobile body such as ship, automobile, or airplane and a fixed point such as home or office, and also means an intercommunication between two mobile bodies. In recent years, a portable telephone or a cordless telephone as a kind of means for carrying out the mobile communication has been extensively developed.

In general, a telephone is used with a receiver section put to the ear and a transmitter section kept near the mouth. So also in a portable telephone, it is necessary to ensure a sufficient distance between the receiver section and the transmitter section. In this circumstance, a conventional portable telephone itself is long and large in size to some extent. The portable telephone is provided with a switch section having a dialing function and a display section. It is known that a protective cover for protecting the switch section only or both the switch section and the display section is foldably mounted to the portable telephone.

However, the conventional protective cover merely has an original function of protecting the switch section only or both the switch section and the display section when not using the portable telephone, and it is of little utility value when using the portable telephone.

SUMMARY OF THE INVENTION

It is therefore an object of the present invention to provide a portable telephone which can be made multifunctional by effectively utilizing the protective cover rotatably mounted to a telephone body.

In accordance with an aspect of the present invention, there is provided a portable telephone comprising a body including a speaker, a microphone, and switch means; a cover rotatably mounted to said body, said cover being adapted to cover at least said switch means when said cover is in a closed condition; cover holding means for rotatably holding said cover with respect to said body, said cover holding means including biasing means for exerting a biasing force to said cover so as to maintain said cover at a stable position when said cover is in an open condition; and a functional module detachably mounted to said cover.

In accordance with another aspect of the present invention, there is provided a portable telephone comprising a body having a speaker, a microphone, switch means, and a printed wiring board on which transmitting and receiving circuit parts and logic circuit parts are mounted; a functional module mounting member rotatably mounted to said body and having a first connector; a flexible printed wiring board for connecting said printed wiring board to said first connector; holding means for rotatably holding said functional module mounting member to said body, said holding means including biasing means for exerting a biasing force to said functional module mounting member so as to maintain said functional module mounting member at a stable position when said functional module mounting member is rotated relative to said body; and a functional module detachably mounted to said functional module mounting member, said functional module having a second connector adapted to engage said first connector.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
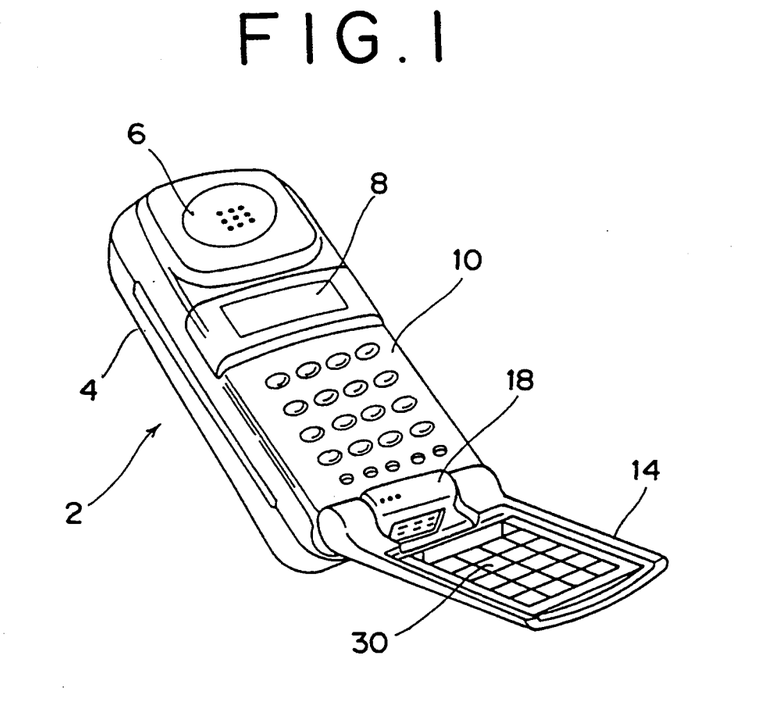
FIG. 1 is a perspective view of a first preferred embodiment of the present invention with the protective cover opened.
Figure 2:
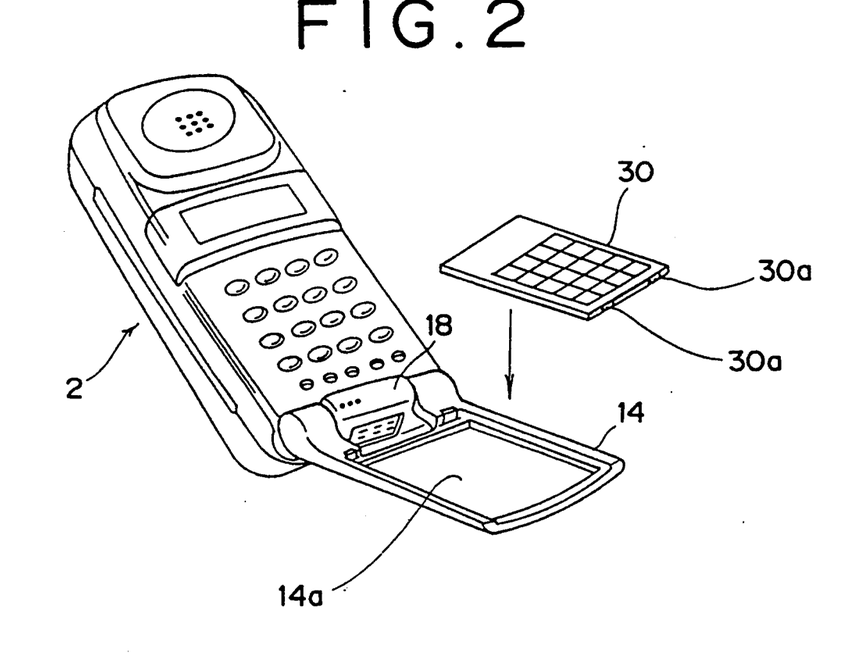
FIG. 2 is an exploded perspective view of the first preferred embodiment.

There will now be described a first preferred embodiment of the present invention with reference to FIGS. 1 to 7C. Referring to FIG. 1, reference numeral 2 generally designates a body of the portable telephone according to the present invention. A transmitter-receiver unit is incorporated in a case 4 of the body 2. The body 2 is provided with a receiver section 6 incorporating a speaker therein, a liquid crystal display (LCD) 8, a switch section 10 having a dialing function, and a transmitter section (not shown) incorporating a microphone therein. Reference numeral 14 designates a protective cover for the switch section 10. The protective cover 14 is rotatably mounted to a cover mounting projection 18 of the case 4. FIGS. 1 and 2 show an open condition of the protective cover 14. When not using the portable telephone, the protective cover 14 is rotated so as to cover the switch section 10 and protect the same.

Figure 3:
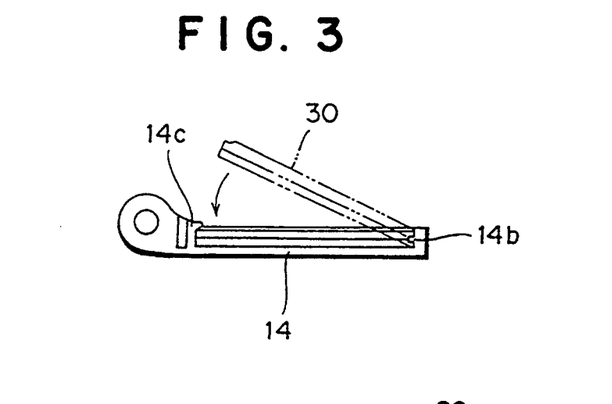
FIG. 3 is a side view of the protective cover for illustrating an engaging structure of an electronic calculator module to be mounted on the protective cover.

An electronic calculator module 30 is detachably mounted on a mounting portion 14a of the protective cover 14. As shown in FIG. 2, the electronic calculator module 30 is formed at its one end with a pair of recesses 30a, while as shown in FIG. 3, the protective cover 14 is formed with a pair of hooks 14b adapted to respectively engage the recesses 30a of the module 30. The protective cover 14 is further formed with a pawl 14c for holding the other end of the module 30. With this arrangement, the module 30 is mounted to the protective cover 14 so that the former may be removed from the latter. In this manner, by mounting the electronic calculator module 30 to the protective cover 14, the portable telephone can be given a function as an electronic calculator.

Figure 4:
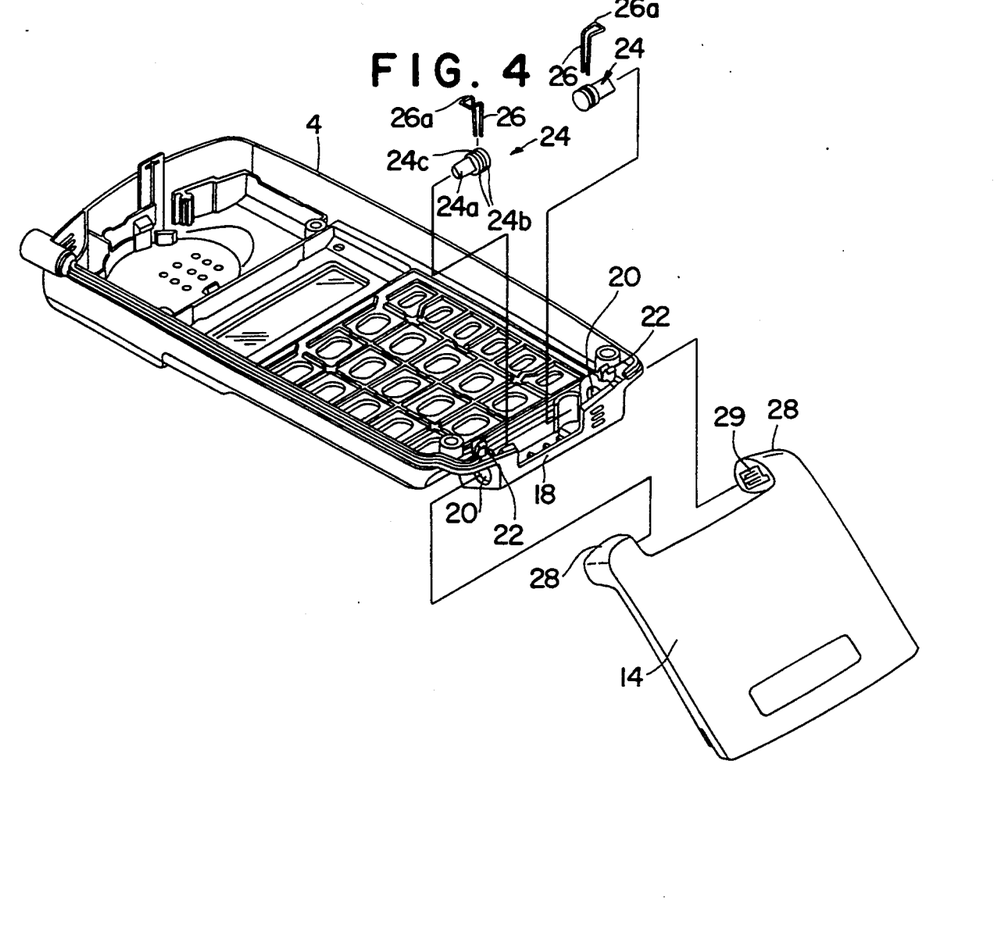
FIG. 4 is an exploded perspective view showing the protective cover holding mechanism in the first preferred embodiment according to the present invention.

FIG. 4 is an exploded perspective view of the cover holding mechanism in the first preferred embodiment, and it shows a condition where the body case 4 is viewed from its back side. The case 4 is integrally formed at its lower end with a cover mounting projection 18 having a pair of circular holes 20 at opposite ends thereof. The case 4 is further formed with a pair of projections 22 adapted to respectively engage a pair of U-shaped springs 26 which will be hereinafter described.

Reference numerals 24 denote a pair of shafts for rotatably mounting the cover 14 to the case 4. Each shaft 24 is formed at its one end with a mounting portion 24a. On the other hand, the cover 14 is integrally formed with a pair of mounting projections 28 each having a hole 29. The mounting portions 24a of the shafts 24 are adapted to be press-fitted with the holes 29 of the mounting projections 28 of the cover 14. Further, each shaft 24 is formed at its other end with a pair of annular lands 24b. Between both the annular lands 24b, there is formed an angular plate portion 24c for stably holding the cover 14 at a predetermined inclined angle with respect to the case 4. The angular plate portions 24c of the shafts 24 are adapted to respectively engage the U-shaped springs 26 each having a bent portion 26a at one end thereof.

The cover 14 is mounted to the case 4 in the following manner. First, the holes 29 of the cover 14 are aligned to the holes 20 of the case 4, and the mounting portions 24a of the shafts 24 are rotatably inserted through the holes 20 of the case 4 and press-fitted into the holes 29 of the cover 14. Then, the U-shaped springs 26 are brought into engagement with the angular plate portions 24c of the shafts 24, and the bent portions 26a of the U-shaped springs 26 are brought into engagement with the projections 22 of the case 4. Thus, the cover 14 is rotatably mounted to the case 4.

Figure 5:
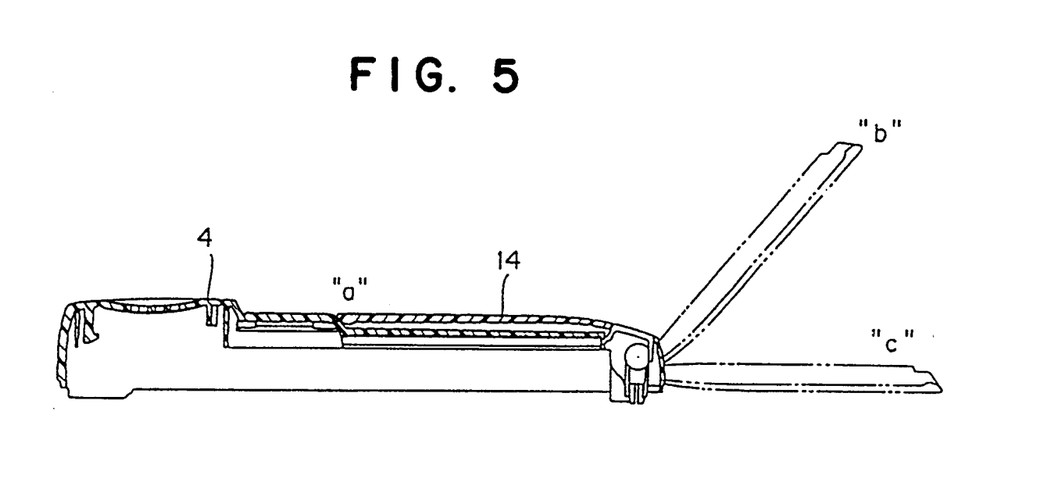
FIG. 5 is a vertical sectional view showing stepwise rotational positions of the protective cover rotatably mounted to the case.
Figure 6:
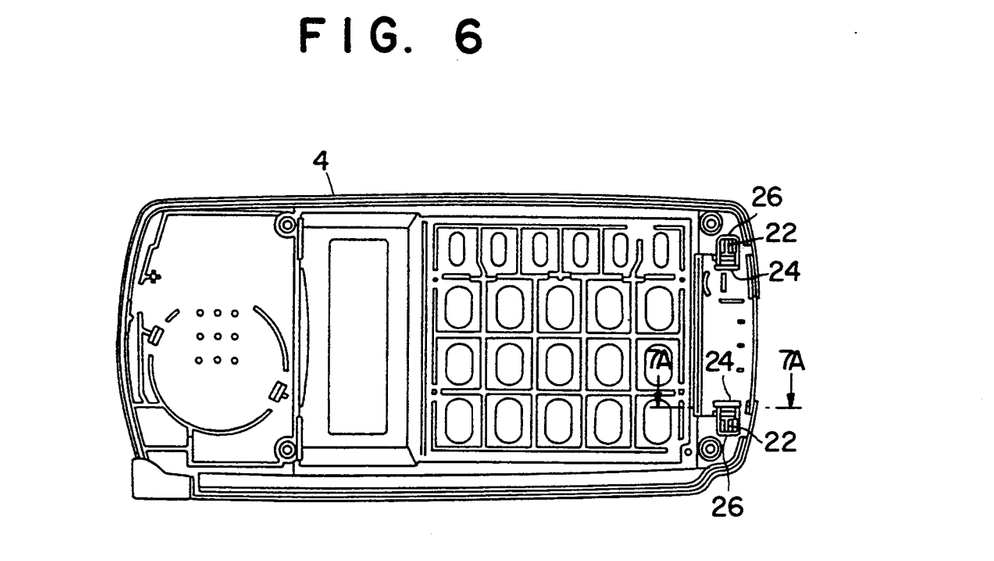
FIG. 6 is a bottom plan view of the case shown in FIG. 5 under the closed condition of the protective cover.

FIG. 5 shows such a rotatably mounted condition of the cover 14 with respect to the case 4 in vertical section, and FIG. 5 is a bottom plan view of FIG. 5.

The operation of the cover holding mechanism will now be described with reference to FIGS. 7A to 7C. In this preferred embodiment, a stable position of the cover 14 is a position "b" shown in FIG. 5 where the cover 14 is inclined at 145° with respect to the case 4. In this stable position of the cover 14, each U-shaped spring 26 tightly contacts two opposite flat surfaces 25a of the angular plate portion 24c of each shaft 24 as shown in FIG. 7B. An inclined surface 25b is formed continuously from one end of each flat surface 25a, so as to permit smooth rotation of the cover 14.

Figure 7A:
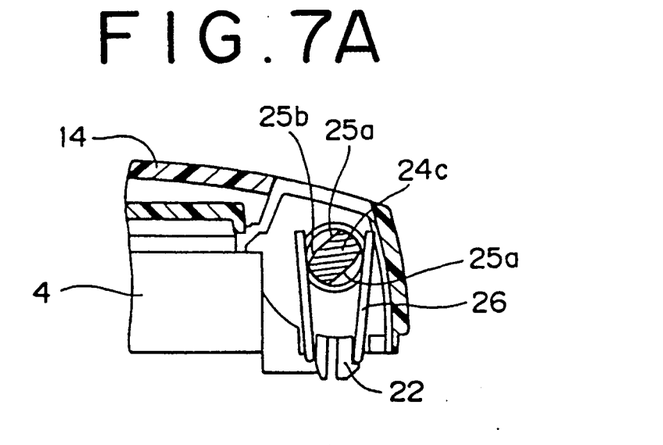
FIGS. 7A, 7B and 7C are cross sections taken along the lines A—A in FIG. 6, corresponding to cover positions "a", "b" and "c" shown in FIG. 5.
Figure 7B:
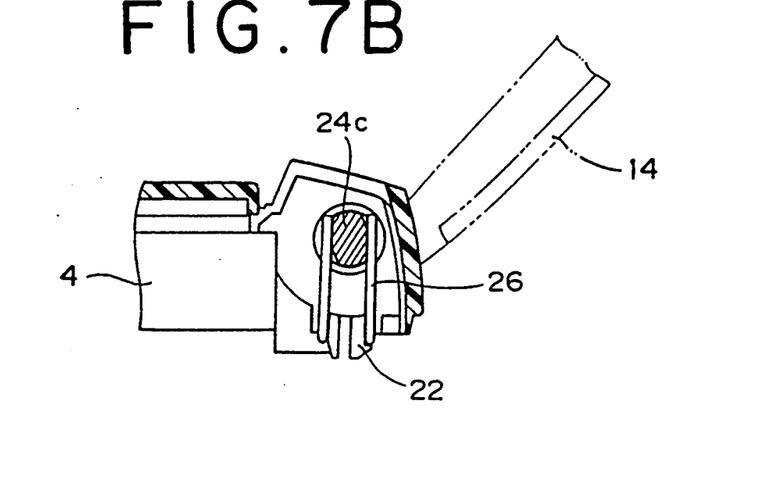

FIG. 7A shows a closed condition of the cover 14, which corresponds to a position "a" shown in FIG. 5. In this condition, the U-shaped springs 26 operate to press the cover 14 against the case 4 through the angular plate portions 24c of the shafts 24. Accordingly, it is not necessary to provide a lock mechanism for maintaining a closed condition of the cover 14, and the operability in practical use can be improved.

Figure 7C:
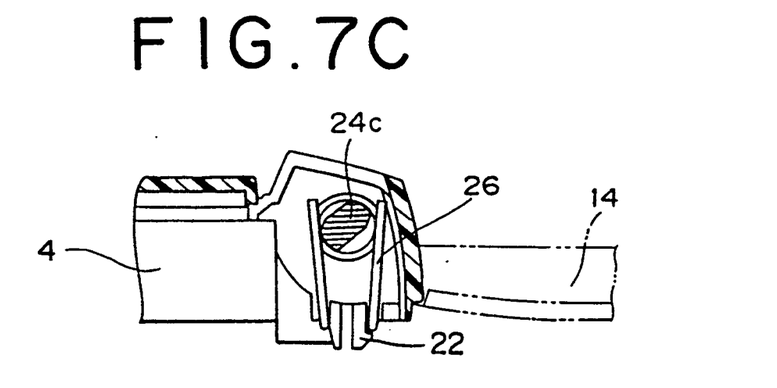

FIG. 7C shows a fully open condition of the cover 14 obtained against a biasing force of the U-shaped springs 26, which corresponds to a position "c" shown in FIG. 5. In this condition, the U-shaped springs 26 exert a biasing force in a closing direction of the cover 14 through the angular plate portions 24c of the shafts 24, so that the cover 14 is resiliently retained. Accordingly, in an exemplary case such that the portable telephone with the cover 14 open is put on a flat surface such as a desk surface under the condition where the switch section 10 faces the flat surface, and that a load is applied to the portable telephone from the back side of the case 4, the cover 14 is rotated to become the condition of FIG. 7C against the biasing force of the U-shaped springs 26, thus obviating a possibility of breakage of the cover 14. In this preferred embodiment, an angle defined between the flat surface 25a of the angular plate portion 24c of each shaft 24 and the cover 14 is set to 55°, so that the cover 14 is stably held in open position inclined at 145° with respect to the case 4.

While a single stable position of the cover 14 is set by forming the angular plate portion 24c in the vicinity of one end of each shaft 24 in this preferred embodiment, a plurality of stabilizer points may be set by forming a portion of each shaft 24 in the vicinity of one end thereof into a polygonal sectional shape. In this preferred embodiment, the stable position of the cover 14 is set in a position where the cover 14 is inclined at 145° with respect to the case 4 because an S/N characteristic in the transmitter section becomes maximum at this posture during the telephonic communication.

Figure 8:
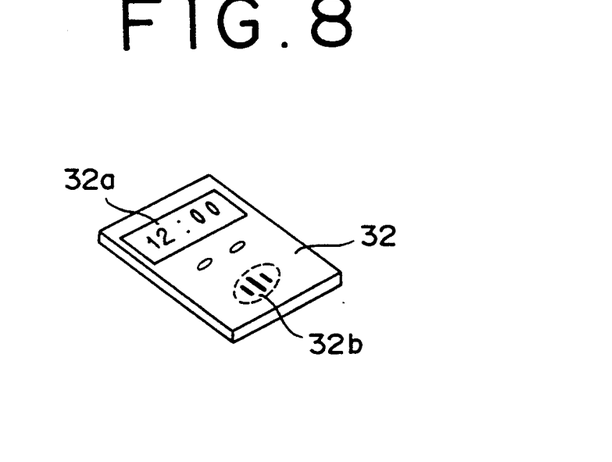
FIG. 8 is a perspective view of a clock module to be mounted on the protective cover.

FIG. 8 shows a clock module 32. By removing the electronic calculator module 30 from the protective cover 14 and instead mounting the clock module 32 to the protective cover 14, the portable telephone can be given a function as a clock. As shown in FIG. 8, the clock module 32 has an LCD 32a for displaying a time and incorporates a buzzer 32b for sounding a time.

Figure 9:
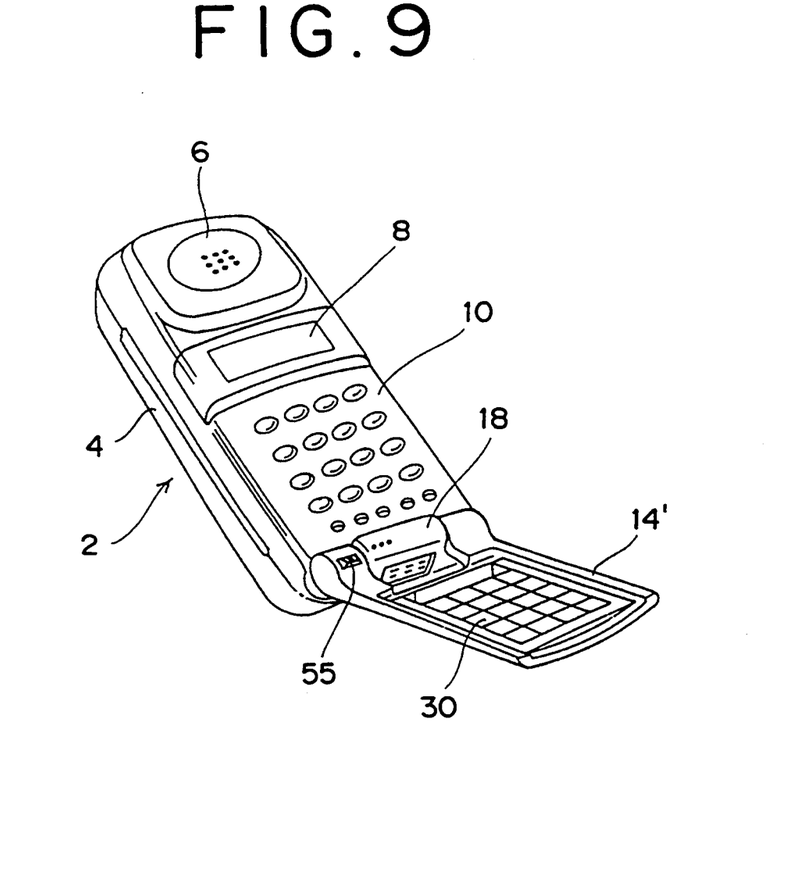
FIG. 9 is a perspective view of a second preferred embodiment of the present invention.

There is shown in FIG. 9 a second preferred embodiment of the present invention, in which a protective cover 14' is detachably mounted to the body 2 of the portable telephone. A mounting mechanism for the protective cover 14' will now be described with reference to FIGS. 10 to 13. The protective cover 14' is integrally formed with a pair of mounting portions 34 and 36 respectively defining cavities 34a and 36a therein. In the cavity 34a of the mounting portion 34, a short shaft 38 is mounted so as to be normally biased by a coil spring 40 in a direction such that the short shaft 38 is partially projected outside the cavity 34a. The short shaft 38 is integrally formed with a release button 55 for effecting the removal of the protective cover 14'.

Figure 11:
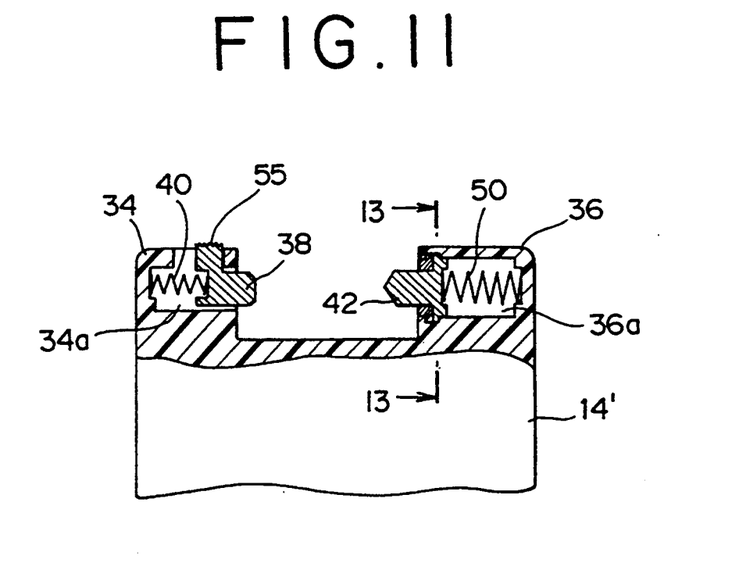
FIG. 11 is a sectional view of a removable mounting structure of the protective cover according to the second preferred embodiment.
Figure 12:
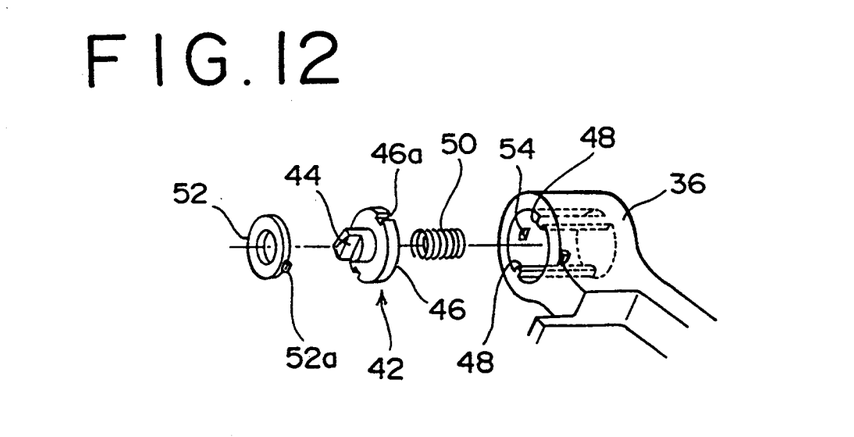
FIG. 12 is an exploded perspective view of a righthand portion of the removable mounting structure shown in FIG. 11.
Figure 13:
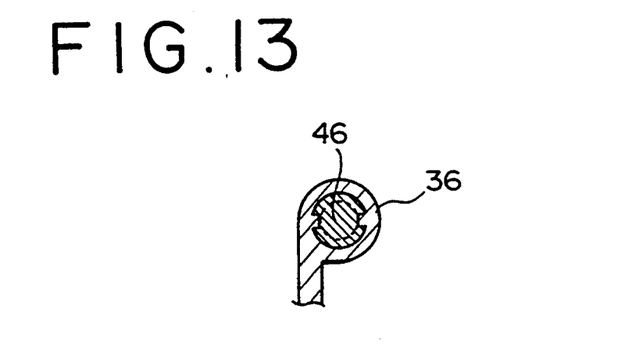
FIG. 13 is a cross section taken along the line A—A in FIG. 11.

On the other hand, a short shaft 42 is mounted in the cavity 36a of the mounting portion 36 so as to be normally biased by a coil spring 50 in a direction such that the short shaft 42 is partially projected outside the cavity 36a. The short shaft 42 has an angular plate portion 44 and a large-diameter portion 45. The large-diameter portion 46 is formed with a pair of axial grooves 46a, while an inner wall of the cavity 36a is formed with a pair of guide rails 48 adapted to respectively engage the axial grooves 46a of the large-diameter portion 46. The inner wall of the cavity 36a is further formed with a pair of recesses 54 adapted to respectively engage a pair of projections 52a of a stop ring 52 for preventing escape of the short shaft 42 out of the cavity 36a. With this arrangement, after inserting the coil spring 50 into the cavity 36a and then inserting the short shaft 42 into the cavity 36a, the short shaft 42 is prevented from rotating relative to the mounting portion 36 by the engagement of the axial grooves 46a with the guide rails 48. Thereafter, the stop ring 52 is inserted into the cavity 36a so as to abut against the large-diameter portion 46 of the short shaft 42 in such a manner that the stop ring 52 is prevented from escaping out of the cavity 36a by the engagement of the projections 52a with the recesses 54.

Figure 10:
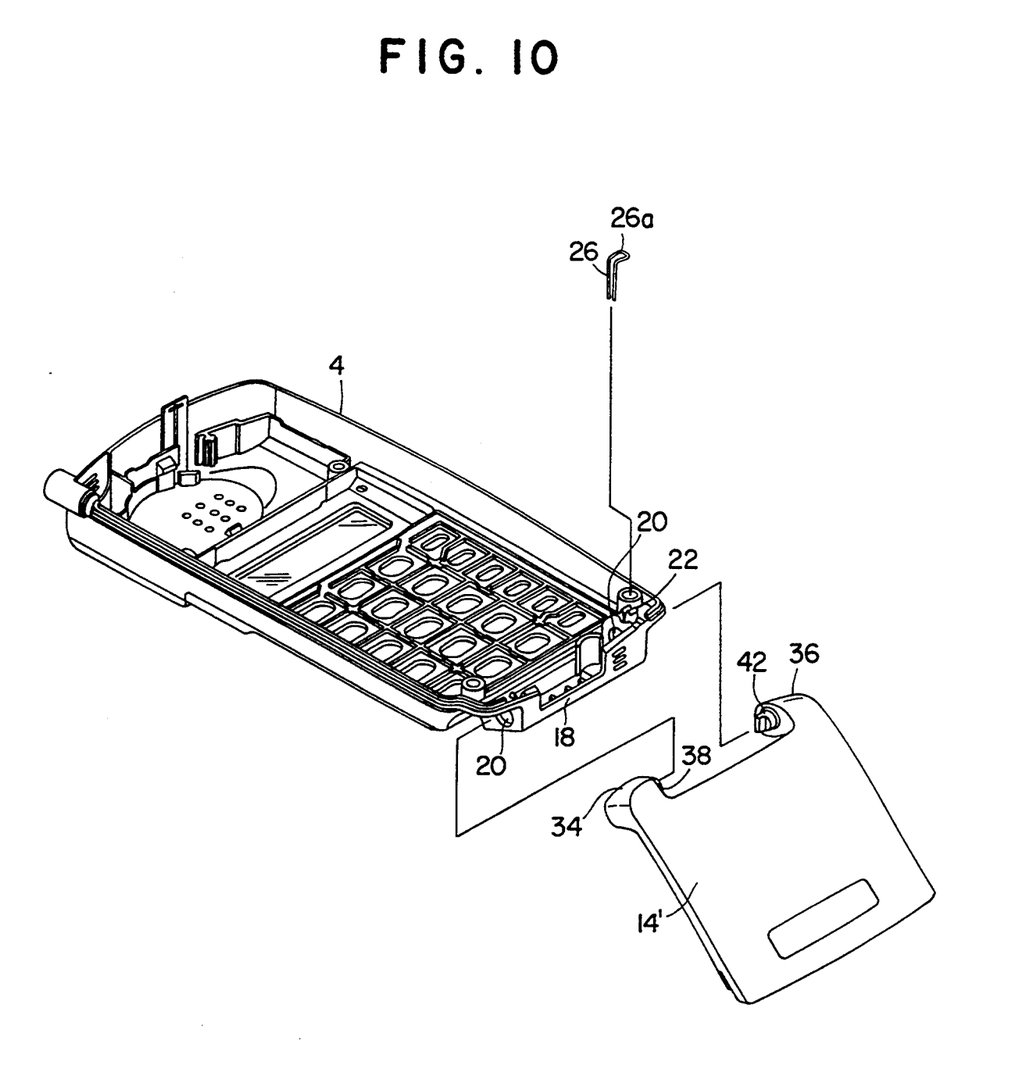
FIG. 10 is an exploded perspective view of the protective cover holding mechanism according to the second preferred embodiment.

Both the short shafts 38 and 42 respectively mounted in the cavities 34a and 36a of the mounting portions 34 and 36 of the protective cover 14' are engaged with a pair of holes 20 formed through a cover mounting projection 18 of a case 4 of the body 2, thereby rotatably mounting the protective cover 14' to the body 2. Thereafter, as shown in FIG. 10, a U-shaped spring 26 is engaged with the angular plate portion 44 of the short shaft 42. With this arrangement, when the protective cover 14' is in an open condition with respect to the body 2, the former is held in a stable position inclined at about 145° with respect to the latter similarly to the first preferred embodiment. In the case of removing the protective cover 14' from the body 2, the release button 55 is moved leftwardly as viewed in FIG. 11 against the coil spring 40, so that the protective cover 14' can be easily removed from the body 2.

Figure 14:
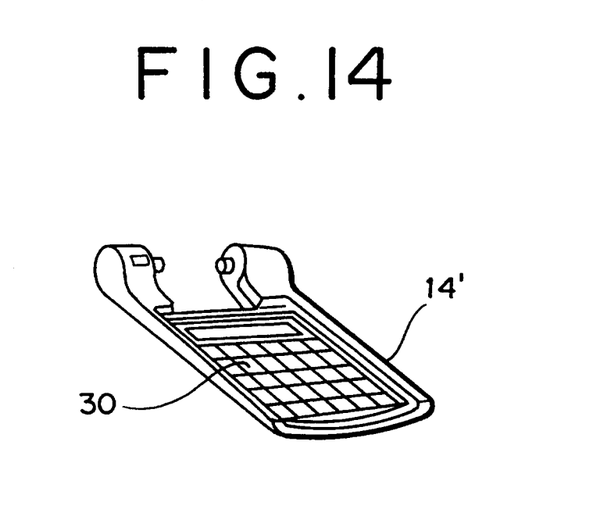
FIG. 14 is a perspective view of the protective cover according to the second preferred embodiment with the electronic calculator module mounted thereon.
Figure 15:
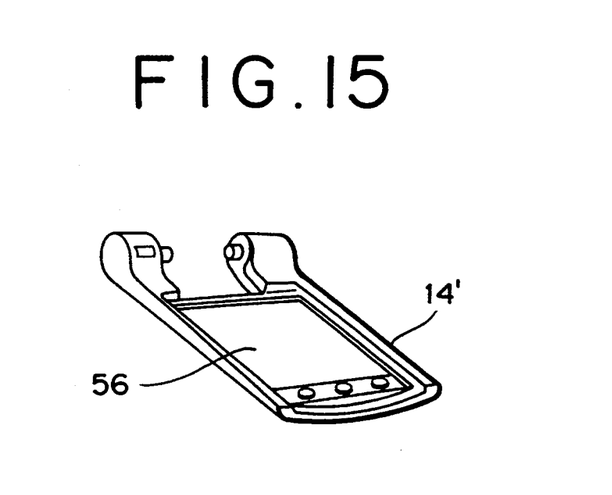
FIG. 15 is a perspective view of the protective cover according to the second preferred embodiment with a game module mounted thereon.

FIG. 14 shows the protective cover 14' removed from the body 2. The electronic calculator module 30 is mounted on the protective cover 14' shown in FIG. 14. FIG. 15 also shows the protective cover 14' removed from the body 2. However, the electronic calculator module 30 is removed from the protective cover 14', and instead a game module 56 is mounted on the protective cover 14'. By rotatably mounting the protective cover 14' having the game module 56 to the body 2, the portable telephone can be given a game function.

Figure 16:
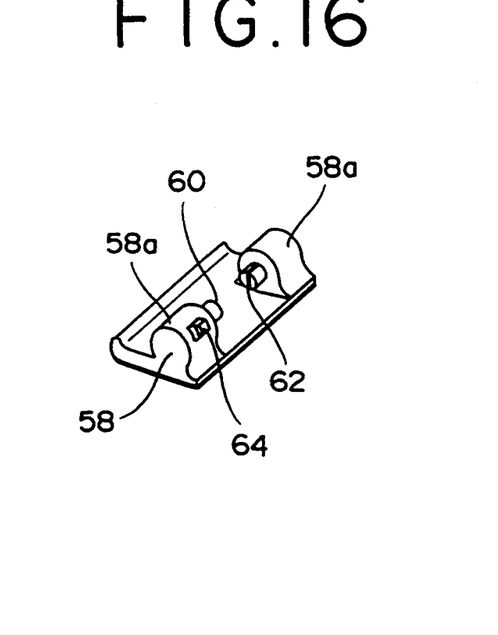
FIG. 16 is a perspective view of a telephone stand on which the body of the portable telephone is to be mounted.
Figure 17:
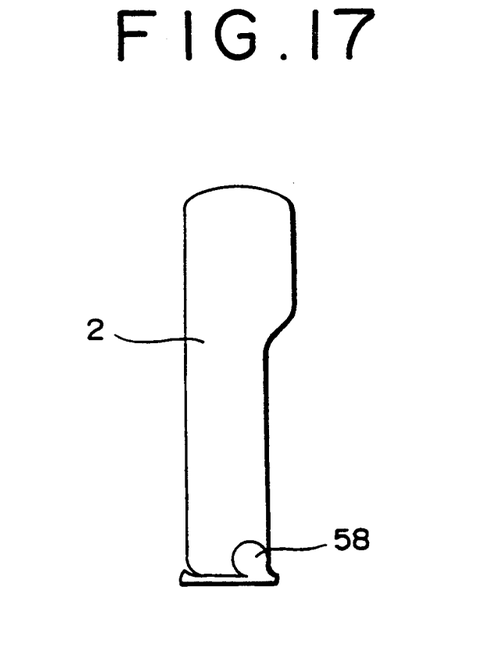
FIG. 17 is a side view of the telephone stand with the body of the portable telephone mounted thereon.

FIG. 16 shows a telephone stand 58. The telephone stand 58 is formed with a pair of projecting portions 58a. A pair of short shafts 60 and 62 are mounted in the projecting portions 58a, respectively, in such a manner as to be normally biased by a pair of coil springs (not shown) in opposite directions such that the short shafts 60 and 62 are partially projected outside the respective projecting portions 58a. The short shaft 60 is integrally formed with a release button 64. After removing the protective cover 14' from the body 2 of the portable telephone, the body 2 is placed on the telephone stand 58 under the upright condition as shown in FIG. 17. Telephone communication can be carried out under the upright condition of the body 2 retained by the telephone stand 58 with the short shafts 60 and 62 inserted in the holes 20 of the case 4 of the body 2. The use of the telephone stand 58 provides convenience in the case that user's hands are fully occupied.

Figure 18:
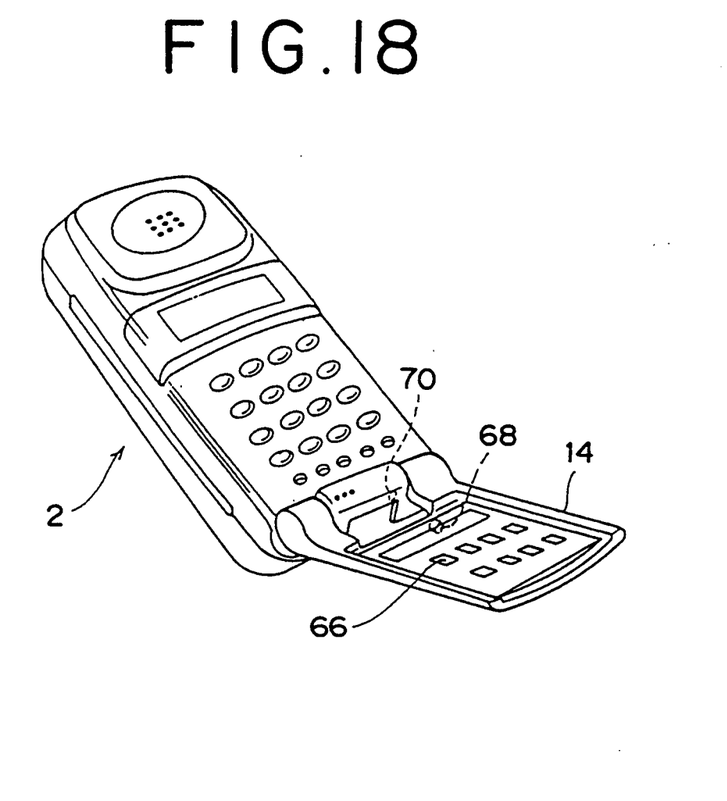
FIG. 18 is a perspective view of a third preferred embodiment of the present invention.
Figure 19:
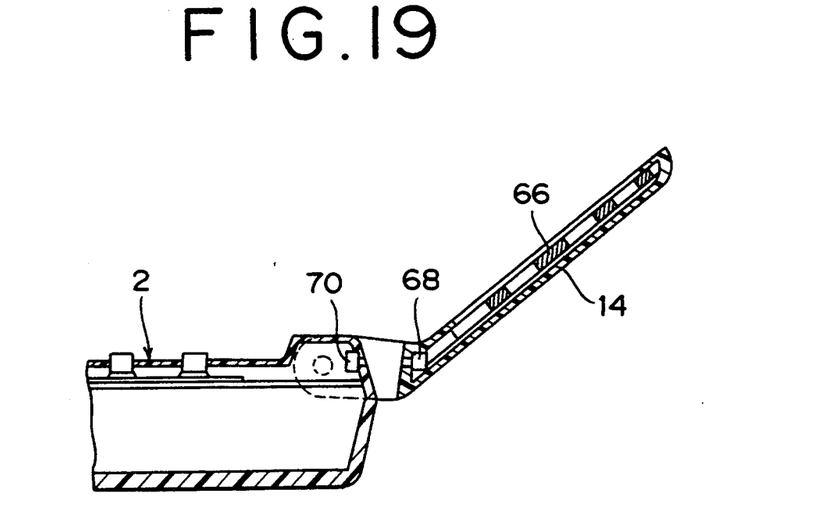
FIG. 19 is a fragmentary sectional view of the third preferred embodiment.

FIG. 18 shows a third preferred embodiment of the present invention in perspective, and FIG. 19 is a sectional view of an essential part of the portable telephone shown in FIG. 18. A data module 66 storing various data such as telephone numbers is detachably mounted on the protective cover 14. The protective cover 14 is provided with a light emitting device 68, while the body 2 is provided with a light receiving device 70 for receiving light from the light emitting device 68. The light emitting device 68 is operated to emit light according to data stored in the data module 66, and the light is received by the light receiving device 70. Thus, the data can be optically transmitted from the data module 66 to the body 2 of the portable telephone.

In modification, the light emitting device 66 may be provided on the body 2 and the light receiving device 70 may be provided on the protective cover 14. In this case, a signal can be optically transmitted from the body 2 to the protective cover 14.

Figure 20:
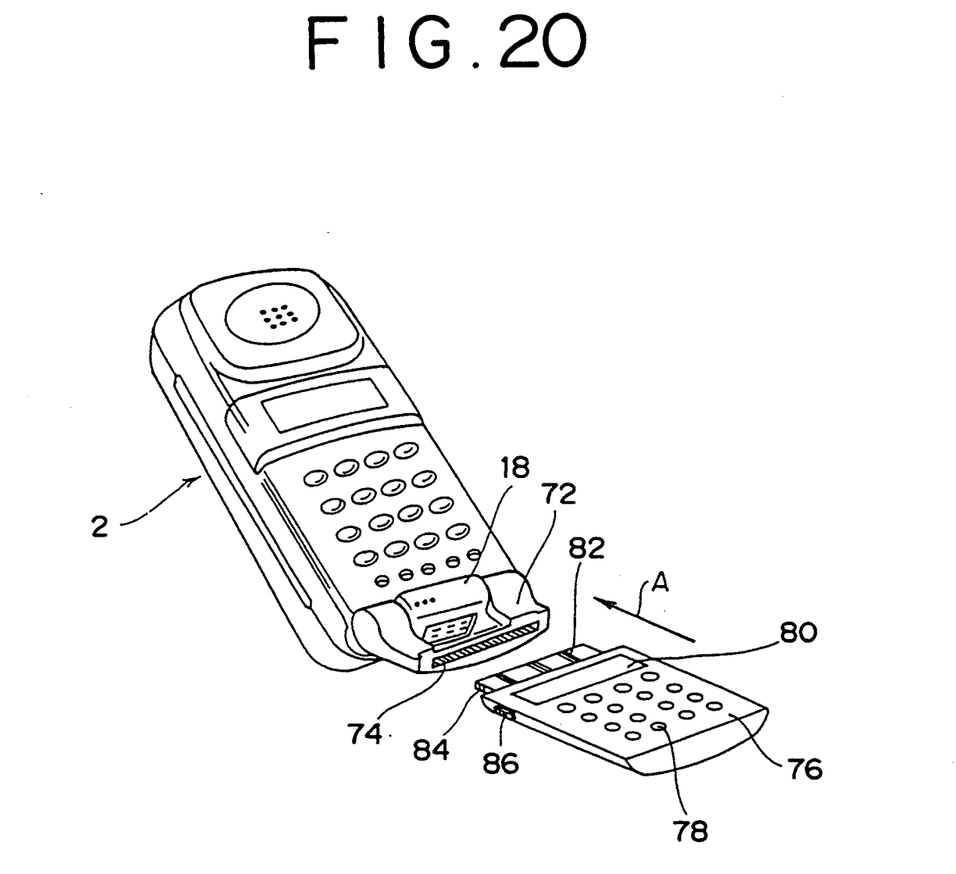
FIG. 20 is a perspective view of a fourth preferred embodiment of the present invention.
Figure 21:
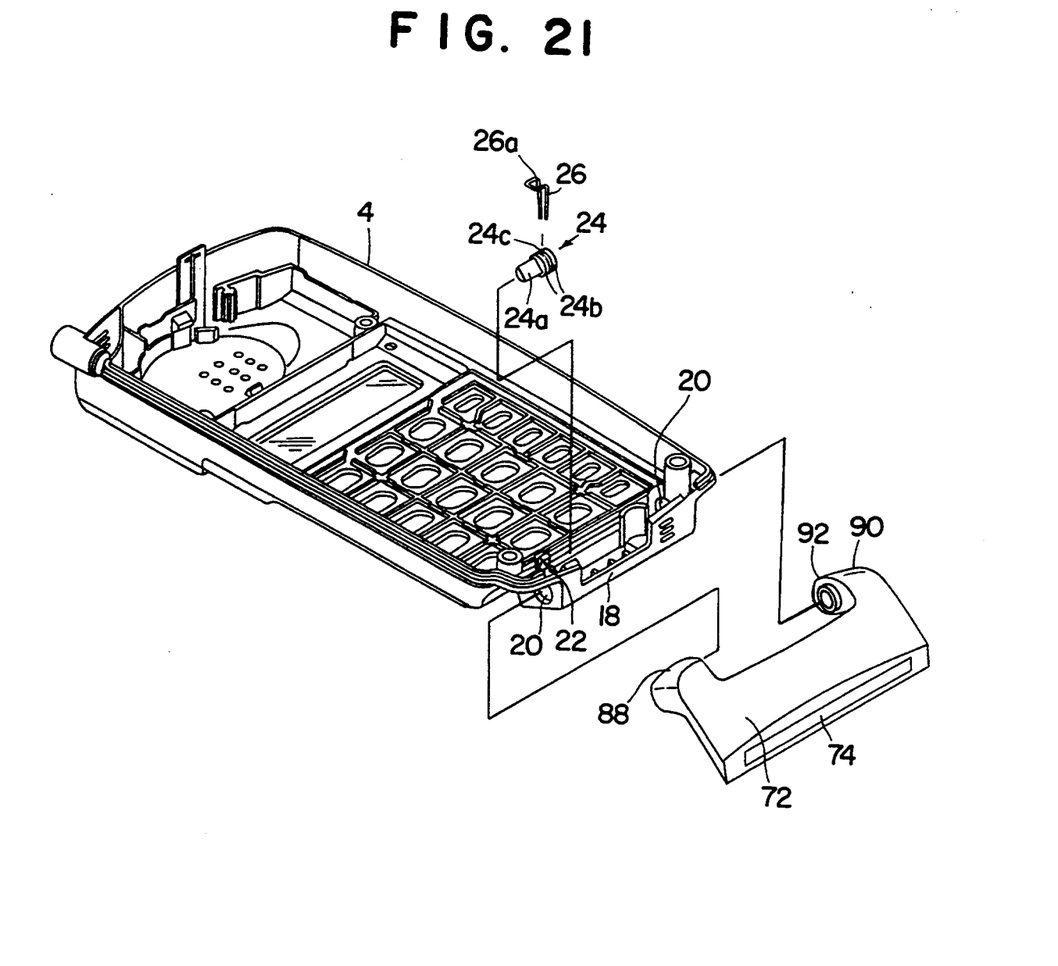
FIG. 21 is an exploded perspective view illustrating a mounting mechanism for the functional module mounting member according to the fourth preferred embodiment.
Figure 22:
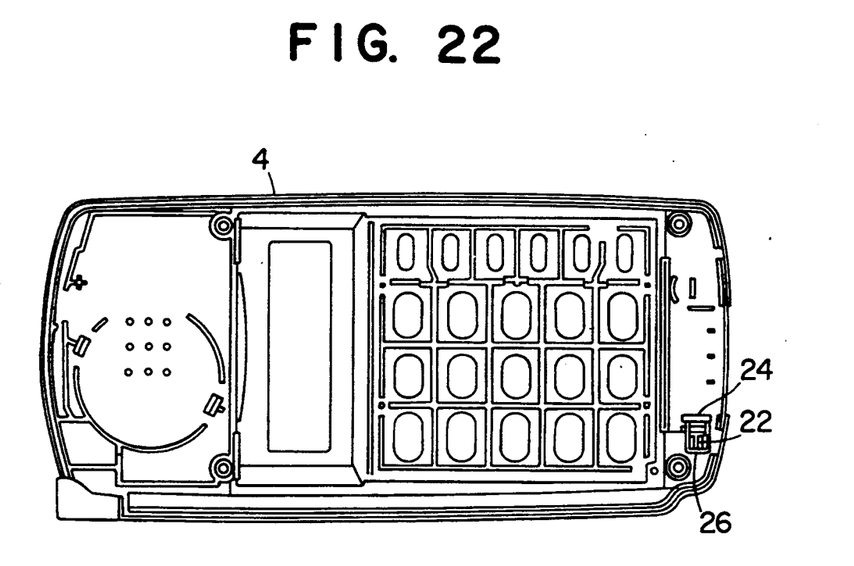
FIG. 22 is a bottom plan view of a body case according to the fourth preferred embodiment.

FIG. 20 shows a fourth preferred embodiment of the present invention in perspective. In this preferred embodiment, a functional module mounting member 72 is rotatably mounted to the cover mounting projection 18 of the body 2 of the portable telephone. The functional module mounting member 72 has a female connector 74. A telephone memorandum module 76 has a male connector 82 adapted to engage the female connector 74 of the functional module mounting member 72. The telephone memorandum module 76 has a switch section 78 and an LCD 80. The telephone memorandum module 76 is provided with a lock pawl 84 for locking the engagement between the female connector 74 and the male connector 82, and is also provided with a release button 86 integrally formed with the lock pawl 84.

Now, a mechanism for rotatably holding the functional module mounting member 72 in this preferred embodiment will be described with reference to FIGS. 21 to 24. The functional module mounting member 72 is integrally formed with a pair of mounting portions 88 and 90. The mounting portion 88 is formed similarly to the mounting portion 28 of the protective cover 14 shown in FIG. 4. That is, the mounting portion 88 has a hole (not shown) for receiving the mounting portion 24a of the shaft 24 in press-fitting relationship therewith after the mounting portion 24a of the shaft 24 is inserted through one of the holes 20 of the cover mounting portion 18 of the case 4. The other mounting portion 90 is integrally formed with a sleeve 92 adapted to rotatably engage the other hole 20 of the cover mounting projection 18 of the case 4.

Figure 23:
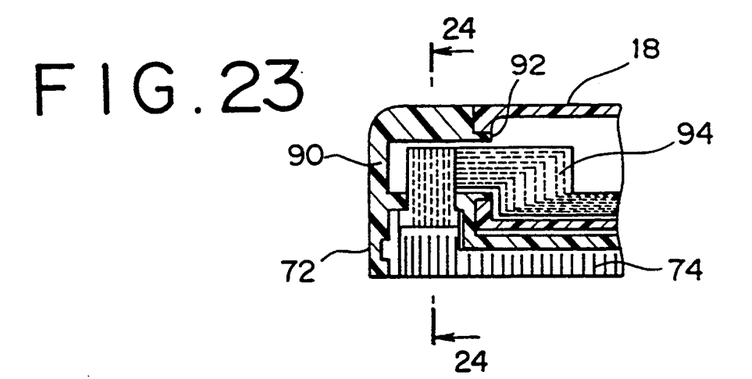
FIG. 23 is a sectional view illustrating a connecting structure employing a flexible printed wiring board according to the fourth preferred embodiment.
Figure 24:
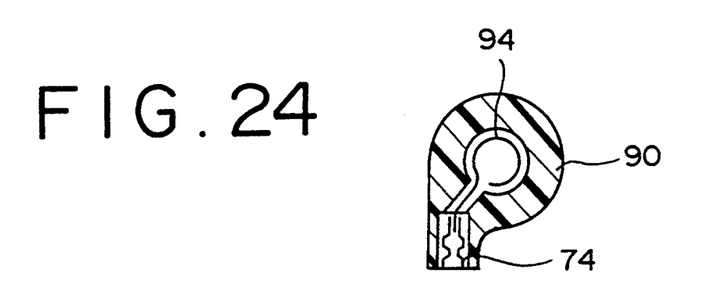
FIG. 24 is a cross section taken along the line A—A in FIG. 23.

Referring to FIGS. 23 and 24, a flexible printed wiring board 94 is accommodated in the sleeve 92 and the mounting portion 90. The flexible printed wiring board 94 is connected at its one end to the female connector 74, and the other end is connected to a printed wiring board (not shown) provided in the body 2 of the portable telephone. The functional module mounting member 72 is rotatably mounted to the case 4 in the following manner. That is, the sleeve 92 is first brought into rotatable engagement with one of the holes 20 of the cover mounting projection 18. Then, the U-shaped spring 26 is brought into resilient engagement with the angular plate portion 24c of the shaft 24 which has been press-fitted with the hole of the mounting portion 88. Thus, the functional module mounting member 72 is rotatably mounted to the case 4. Further, when the functional module mounting member 72 is in an operative open condition, it is held in a stable position inclined at about 145° with respect to the case 4.

In this preferred embodiment, the female connector 74 of the functional module mounting member 72 is connected through the flexible printed wiring board 94 to the printed wiring board provided in the body 2. Accordingly, data such as telephone numbers stored in the telephone memorandum module 76 connected to the functional module mounting member 72 can be transmitted to the body 2. In the case of removing the telephone memorandum module 76 from the functional module mounting member 72 mounted to the body 2, the release button 86 is depressed by a user to unlock the lock pawl 84 and accordingly release the connection between the female connector 74 of the functional module mounting member 72 and the male connector 82 of the telephone memorandum module 76.

Figure 25:
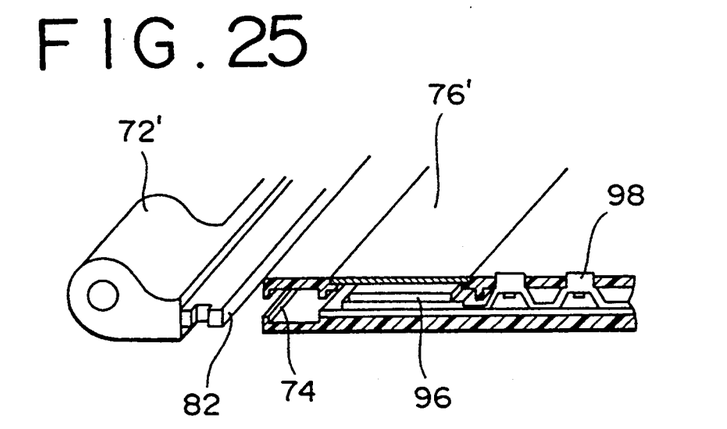
FIG. 25 is a fragmentary perspective view of a fifth preferred embodiment of the present invention.

FIG. 25 shows an essential part of a fifth preferred embodiment of the present invention in perspective. In this preferred embodiment, a functional module mounting member 72' has the male connector 82, and a telephone memorandum module 76' has the female connector 74. In FIG. 25, reference numerals 96 and 98 denote an LCD and a key switch, respectively. Like the fourth preferred embodiment, data such as telephone numbers or addresses can be transmitted from the telephone memorandum module 76' through the connectors 74 and 82 to the body 2.

It is to be noted that the above-mentioned functional modules such as electronic calculator module, clock module, game module, data module and telephone memorandum module are merely illustrative, and that the functional module to be employed in the present invention is not limited to the above illustrated functional modules. For instance, the functional module according to the present invention may include a control module for externally controlling electrical equipments in an office or home, a personal computer communication module, a word processor communication module, a calendar module, and a pager module. In particular, the pager module is capable of operating by itself for a long period of time.

Accordingly, by keeping the pager module in an on state and the portable telephone in an off state, consumption of a battery as a power source for the portable telephone can be reduced.

What is claimed is:

1. A portable telephone comprising:
   a body including a speaker, a microphone, and switch means;
   a cover rotatably mounted to said body, said cover being adapted to cover at least said switch means when said cover is in a closed condition;
   cover holding means for rotatably holding said cover with respect to said body, said cover holding means comprising:
      a cover mounting projection integrally formed with said body and having a pair of holes formed therein;
      a pair of shafts each respectively rotatably inserted through one of said holes, each of said shafts having a first end fixed to said cover and a second end having a plate portion; and
      a pair of U-shaped springs fixed to said body so as to respectively nip said plate portions of said shafts to maintain said cover at a stable position when said cover is in an open condition; and
   a functional module detachably mounted to said cover.

2. The portable telephone according to claim 1, wherein one of said cover and said body is provided with a light emitting device and the other of said cover and said body is provided with a light receiving device, whereby optical communication between said cover and said body can be carried out.

* * * * *